United States Patent
Nelson et al.

(10) Patent No.: US 6,877,270 B2
(45) Date of Patent: *Apr. 12, 2005

(54) PEST CONTROL DEVICE

(75) Inventors: Thomas D. Nelson, Maplewood, MN (US); Vince R. Harris, Woodbury, MN (US); Martijn Loerakker, Minneapolis, MN (US)

(73) Assignee: Ecolab Inc., Mendota Heights, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/386,377

(22) Filed: Mar. 10, 2003

(65) Prior Publication Data

US 2003/0208949 A1 Nov. 13, 2003

Related U.S. Application Data

(63) Continuation-in-part of application No. 10/112,644, filed on Mar. 28, 2002, now Pat. No. 6,725,597.

(51) Int. Cl.[7] .......................... A01M 23/00; A01M 1/10
(52) U.S. Cl. ................... 43/58; 43/60; 43/114
(58) Field of Search ............................ 43/124

(56) References Cited

U.S. PATENT DOCUMENTS

| | | | | |
|---|---|---|---|---|
| 2,716,305 A | | 8/1955 | Schutte | 43/131 |
| 3,221,438 A | * | 12/1965 | Huyssen | 43/124 |
| 4,103,448 A | | 8/1978 | Souza | 43/67 |
| 4,541,198 A | * | 9/1985 | Sherman | 43/131 |
| 5,027,548 A | | 7/1991 | Anderson | 43/131 |

OTHER PUBLICATIONS

International Search Report, B. Moeremans, Jun. 27, 2003.

* cited by examiner

Primary Examiner—Teri Pham Luu
Assistant Examiner—Bret Hayes
(74) Attorney, Agent, or Firm—Merchant & Gould P.C.

(57) ABSTRACT

A pest control device (10), and a method of suppressing a pest, which can be discretely and easily placed, serviced and removed from the proximity of areas where pests, including rodents and insects, are likely to frequent, including the area near the floor-wall juncture (54) behind shelving (44) and/or products (52) or equipment. The pest control device (10) has a pest suppression device (18) having an ingress for the pest and an elongate arm (20') with an overhanging structure (56) having a proximate end (24) and a distal end (26), the proximate end (24) of the elongate arm (20') connected to the pest suppression device (20') communicating with the ingress and facilitating a pathway for the pest from the distal end (26) of the elongate arm (20') to the ingress. The pest suppression device (10) may be mounted on a platform (12 or 14) and the elongate arm (20') mounted instead to the platform (12 or 14).

37 Claims, 9 Drawing Sheets

PEST CONTROL DEVICE

RELATED APPLICATION

This application is a continuation-in-part of U.S. patent application Ser. No. 10/112,644, Pest Control Device, filed Mar. 28, 2002, now U.S. Pat. No. 6,725,597.

TECHNICAL FIELD

The field of the invention relates generally to pest control devices and, particularly, to rodent or insect control devices where the rodent or insect is trapped or poisoned.

BACKGROUND

Controlling and catching pests, including rodents, is a continuing issue for many, especially commercial entities, particularly those involved in the food industry. This issue is particularly significant where pests, such as rodents or insects, are located, or travel, in hard to reach areas, making it difficult to set, retrieve and service traps.

Considerable art relative to trapping of rodents has been developed over the years.

U.S. Pat. No. 5,299,380, Formal, Sr., Rodent Enclosure, describes an enclosure housing for capturing a live rodent unharmed having a baited enclosure chamber, a one way entrance, having an open portal, a level ramp, pivotally mounted in the entrance portal chamber of the enclosure adapted for movement between a level access position and an inwardly and downwardly tilted position to provide access and to automatically return to the level position for preventing escape.

U.S. Pat. No. 5,471,781, Vine, Mouse Trap, describes a trap for capturing mice or other rodents. The device includes a main body having an entrance ramp leading thereinto. A bait container is positioned within the main body to attract a mouse towards a pivotally mounted trap door. A holding compartment positioned beneath the trap door receives the mouse within a removable drawer. The drawer includes an insertable screen which permits removal of the drawer and transport of the mouse to an exterior area for release thereof.

U.S. Pat. No. 5,528,852, Sarff, Rotating Cylinder Rodent Trap, describes a trap for capturing rodents within a bucket. The device includes an axle having a cylinder rotatably positioned therein. A mounting assembly secures the axle across an open upper end of a container. A ramp extends from ground surface to the upper end of the container, whereby a comestible paste applied to the cylinder will lure a rodent up the ramp and onto the cylinder which rotates to deposit the rodent into the container.

U.S. Pat. No. 5,611,171, Hershey, Multiple-Catch Mouse Trap, describes a container with a lid having a plurality of open entrance aperture tubes combined with similar apertures possessing one way passage devices and a bait compartment to induce mice and the like to pass through the one way passage device. It is adapted for use with a variety of standard commercial containers, such as five gallon plastic buckets, oil drums, and trash cans, containing additional bait and captured mice. The one way passage device is located on the top of the container and is utilized for the purpose of preventing mice from reversing their direction and exiting the trap.

U.S. Pat. No. 5,481,824, Fiore, Jr., Rubber Band Powered Mousetrap, and U.S. Pat. No. 5,746,020, Fiore, Jr., et al, Rubber Band and Spring Powered Mousetraps, describe tunnel-type mousetraps having a central trapping mechanism powered by a rubber band or a coil spring. If a rubber band is used, it is wound between an anchor plate in the top wall of the tunnel and a striker plate that fits over the anchor plate and has end walls with trapping apertures that project downwardly through the tunnel. The rubber band urges the striker plate upwardly, and the trap is set by pushing down on the striker plate to engage a pivotal trigger carried by the anchor plate. When a mouse enters the tunnel and dislodges the trigger, the striker plate springs upwardly under the force of the rubber band and traps the mouse's neck in one of the trapping apertures. The trigger may be scented to attract mice and may hold a sunflower seed as additional bait. To provide the trap with a longer shelf life, the rubber band may be replaced by a coil spring fitted between the anchor plate and the striker plate.

U.S. Pat. No. 5,950,354, Carnwath, Bi-Directional Tunnel Rat Trap, describes a tunnel trap for use on paths normally used by rates and has two trips operated sequentially. A rat entering either end of the tunnel activates one trip and advances into the tunnel, activating the other trip, releasing the spring driven striker. The elements of the trap are specifically proportioned to assure that regardless of which direction the rat is passing through the tunnel, it will be trapped and killed.

U.S. Pat. No. 5,996,274, Smith et al, Rodent Trap, describes a rodent trap for drowning a plurality of rodents and other small pests without the need for resetting the trap. The device includes a ramp engageable to a rim of a conventional pail and a rotating body positionable horizontally within the pail. The pail is partially filled with water or a mixture of water and ethylene glycol in such manner that the rotating body is free to rotate a distance above the water or mixture line. The rotating body includes a cylindrical body rotatably mounted to a shaft in such a manner that a rodent or like pest is unable to feed upon a rodent-attracting substance such as peanut butter spread on the cylindrical body without stepping upon the cylindrical body and thereby causing the cylindrical body to rotate and force the rodent or like pest into the water or mixture water and ethylene glycol.

U.S. Pat. No. 6,016,623, Celestine, Rodent Trap, describes a rodent trap which includes a central housing interior into which a rodent is lured by bait and enters on a rodent entry ramp and inside which is located a rotating trap door that is operated by a high speed DC motor which is actuated by an infrared sensor positioned inside the housing. The motor is engaged to rotate the trap door and timed by a cam switch to return to a closed position and ready to operate for the entry of the next rodent. When the rodent falls through the trap door, it falls into a rodent box which is received by an insertion in the housing lower section. The entry ramp facilitates rodent entering the trap at an elevation above the rodent box located in the lower portion of the trap.

Other traps for rodents are shown in the following patents: U.S. Pat. No. 5,148,624, Schmidt, Mousetrap; U.S. Pat. No. 5,245,784, Oscarsson, Rodent and Small Animal Trap; U.S. Pat. No. 5,337,512, Krenzler, Mouse Trap; U.S. Pat. No. 5,386,663, Fields, Multiple Live Mouse Trap; U.S. Pat. No. 5,782,034, Robin et al, Rodent Trap; and U.S. Design Pat. No. D-382,039, Zyra, Mouse Trap With Ramp and Spinning Bait Bobbin.

The above art describes a myriad of devices intended to trap rodents and similar creatures. However, the art all assumes relatively easy access to the place where the rodents are located or are traveling. None of the art addresses the problem of placing, retrieving and maintaining traps in locations which are hard to access.

SUMMARY OF THE INVENTION

Typically, pests, including rodents and insects, prefer to keep out of sight and prefer to keep in relatively confined spaces. Such pests generally prefer to travel, for example, along the intersection of a floor, shelf, or other horizontal surface, and an adjacent wall. This makes the place most likely to intercept a pest, in order to effectively trap the pest, largely inaccessible. In a building, e.g., a warehouse, goods are likely to be placed relatively close to the walls preventing easy access to the wall. The use of shelves particularly limits the availability of access to wall/floor intersection and the positioning of articles on the shelves limits the availability of access to the proximity of the shelves and the wall. A particularly good place to trap such pests is under shelving near the back and in close proximity to the wall in front of which the shelving is placed. This is a very difficult location to place, retrieve and maintain pest traps. Additional areas which are particularly lucrative for trapping pests but which are relatively inaccessible include areas under counters and behind equipment.

Observed rodent activity in areas having food located on shelving, such as grocery stores, has been primarily on the floor under the shelving along the back wall of the shelf. In addition, the rodent activity is often under a shelf in the middle of a floor with no vertical wall nearby. It would then be desirable to create a pathway to direct the rodent activity. For the most effective results, it is preferable to have a rodent control device located in the area most frequented by the rodents. This is a particularly difficult area in which to place, service and remove a rodent control device.

In some cases, it may be necessary to remove product from the shelves and, even, partially disassemble the shelving in order to gain access to the area most frequented by the rodents.

The present invention provides a pest control device, and a method of suppressing a pest, which can be discretely and easily placed, serviced and removed from the proximity of areas where pests, including rodents and insects, are likely to frequent, including the area near the floor-wall juncture behind shelving and/or products or equipment or on the floor under shelving or counters where no vertical wall is nearby.

In an embodiment, the present invention provides a pest control device for controlling a pest. A pest suppression device has an ingress for the pest. An elongate arm having a proximate end and a distal end, the proximate end of the elongate arm connected to the pest suppression device communicating with the ingress and facilitating a pathway for the pest from the distal end of the elongate arm to the ingress, the elongate arm having an overhanging structure inhibiting the pest from transversing the elongate arm.

In another embodiment, the present invention provides a pest control device for controlling a pest. A platform allows for mounting of a pest suppression device having at least one ingress for the pest. An elongate arm having a proximate end and a distal end, the proximate end of the elongate arm connected to the pest suppression device communicating with the ingress and facilitating a pathway for the pest from the distal end of the elongate arm to the ingress, the elongate arm having an overhanging structure inhibiting the pest from transversing the elongate arm.

In a preferred embodiment, the pest control device has a generally planar surface, wherein the generally planar surface is horizontal when the pest control device is in use, the elongate arm has a major axis, and the major axis of the elongate arm is positioned horizontally when the pest control device is in use.

In a preferred embodiment, the elongate arm is a generally planar sheet.

In a preferred embodiment, the generally planar sheet of the elongate arm is substantially vertical.

In a preferred embodiment, the overhanging structure is a generally planar and substantially horizontal top affixed to the generally planar sheet of the elongate arm.

In a preferred embodiment, the generally planar sheet of the overhanging structure at the distal end of the elongate arm has an angular portion which may be removed creating an end of the overhanging structure which has an acute angle with respect to the generally planar sheet allowing the distal end of the elongate arm to be placed in close proximity to an adjoining generally vertical structure when the elongate arm is placed at an acute angle to the adjoining generally vertical structure.

In a preferred embodiment, the elongate arm articulates with respect to the pest suppression device.

In a preferred embodiment, the pest control device has generally planar upper and lower surfaces, the generally planar upper and lower surface being horizontal when the pest control device is in use.

In a preferred embodiment, the pest control device has a plurality of elongate arms, each having a proximate end and a distal end, the proximate end of each of the plurality of elongate arms being connected to the platform allowing communication with the ingress and facilitating a pathway for the pest from the distal end of each of the plurality of elongate arms to the platform.

In a preferred embodiment, the distal end of at least one of the plurality of elongate arms is extendible and retractable with respect to the pest suppression device.

In a preferred embodiment, at least one of the plurality of elongate arms is a planar sheet mounted vertically to the pest suppression device and has a top edge and wherein the top edge of the proximate end of the planar sheet has a plurality of serrations allowing the extendibility of the at least one of the of plurality of elongate arms to be extendible in a plurality of detent positions.

In a preferred embodiment, the platform has a plurality of detents located near the proximate end of at least one of the plurality of elongate arms allowing at least one of the plurality of elongate arms to be pivoted in a plurality of detent positions.

In another embodiment, the present invention provides a method of suppressing a pest, where the pest is expected to be found near a juncture between a horizontal surface and a vertical surface and where access to the juncture between the horizontal surface and the vertical surface is difficult to access. The pest control device is placed on the horizontal surface distant from the juncture of the horizontal surface and the vertical surface. The pest control device has a platform allowing for mounting of a pest suppression device having at least one ingress for the pest. An elongate arm having a proximate end and a distal end, the proximate end of the elongate arm connected to the pest suppression device communicating with the ingress and facilitating a pathway for the pest from the distal end of the elongate arm to the ingress, the elongate arm having an overhanging structure inhibiting the pest from transversing the elongate arm. The distal end of the elongate arm is moved in proximity of the juncture of the horizontal surface and the vertical surface when the pest control device is placed. In this manner, a pathway from the juncture of the horizontal surface and the vertical surface to the pest suppression device is facilitated.

In another embodiment, the present invention provides a method of suppressing a pest, where there is an opening between a horizontal surface and a bottom of a shelf, the shelf having a front edge and a rear edge. A pest control device is placed on the horizontal surface at a position underneath the shelf and positioned between the front edge and the rear edge. The pest control device has a platform allowing for mounting of a pest suppression device having at least one ingress for the pest. An elongate arm having a proximate end and a distal end, the proximate end of the elongate arm connected to the pest suppression device communicating with the ingress and facilitating a pathway for the pest from the distal end of the elongate arm to the ingress, the elongate arm having an overhanging structure inhibiting the pest from transversing the elongate arm. The distal end of the elongate arm is moved to a position between the front edge and the rear edge when the pest control device is placed. In this manner, a pathway from under the shelf to the pest control device is created.

In a preferred embodiment, the pest control device has a second elongate arm having a proximate end and a distal end and the proximate end of the second elongate arm is connected to the platform. The second elongate arm is used as a handle to position the pest control device.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
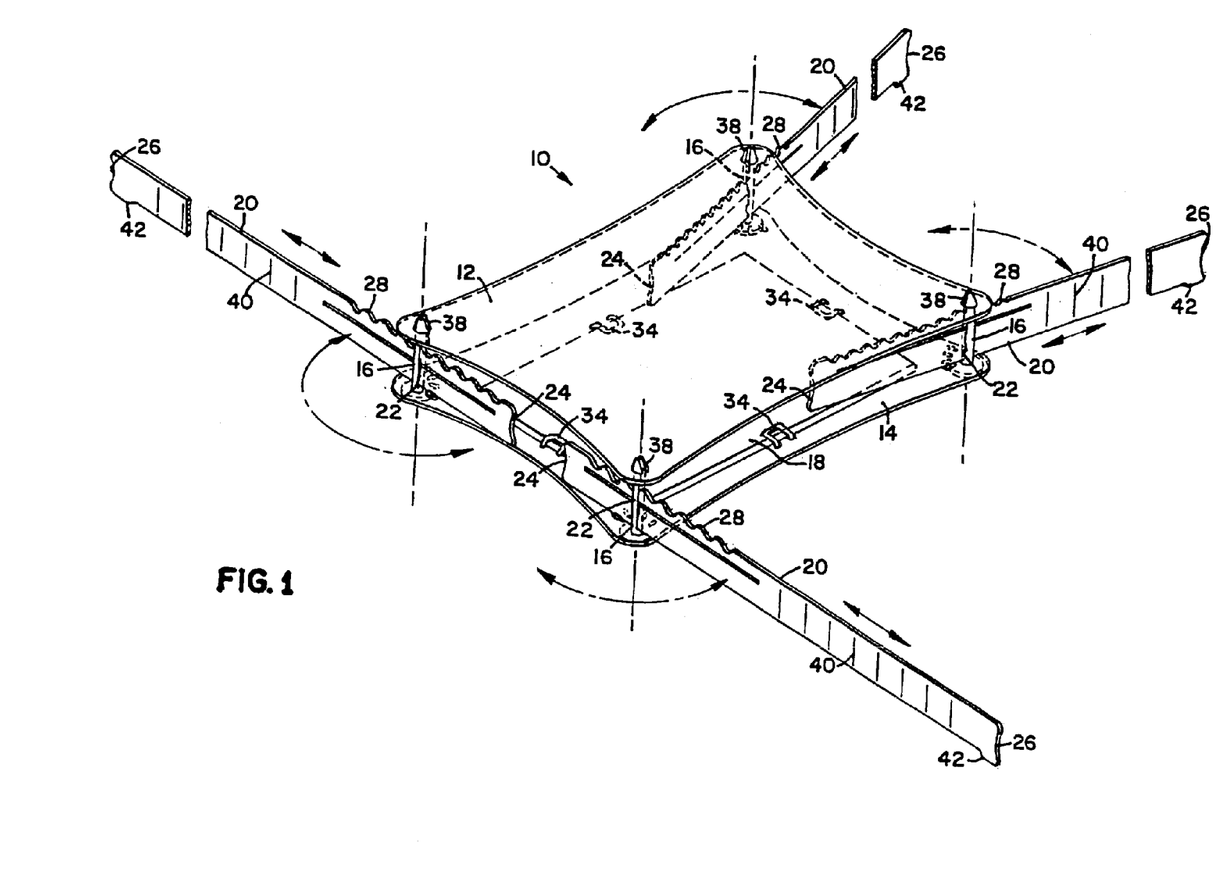
FIG. 1 is a perspective view of an embodiment of the pest control device of the present invention.

In FIG. 1, pest control device 10 comprises an upper platform 12 and a lower platform 14 held spaced apart by pins 16, one pin 16 located at each corner of the upper platform 12 and lower platform 14. The area between upper platform 12 and lower platform 14 forms an area adapted for the placement of a pest suppression device 18.

Elongate arms 20 are attached to pins 16 at each of the corners of upper platform 12 and lower platform 14. In one embodiment, pins 16 have a slot 22 through which the distal end 26 of elongate arm 20 is inserted. This allows elongate arm 20 to slide back and forth through slot 22 either extend distal end 26 of elongate arm 20 further from platforms 12 and 14 or to retract distal end 26 of elongate arm 20 to be closer to platforms 12 and 14. Preferably, the top edge of elongate arm 20 has a serrated edge 28 which, while still allowing elongate arm 20 to slide through slot 22, provides detent positions for elongate arm 20.

Pins 16 inserted through holes 30 in upper platform 12 and lower platform 14 allow pins 16 to pivot allowing elongates arms 20 to also articulate along the plane of the major surface of upper platform 12 and lower platform 14.

Pest suppression device 18 may be any of a wide variety of commercially available suppression devices, including traps and poison. Traps may be any of a variety of single or multiple catch traps and may be rodent or insect traps depending on the desired use of pest control device 10. In one preferred embodiment, pest suppression device may be any of a variety of glue pads capturing any pest, including a rodent or insect, to come into contact with the glue pad. Pest suppression device 18 may also be an integral component of the pest control device 10.

Figure 2:
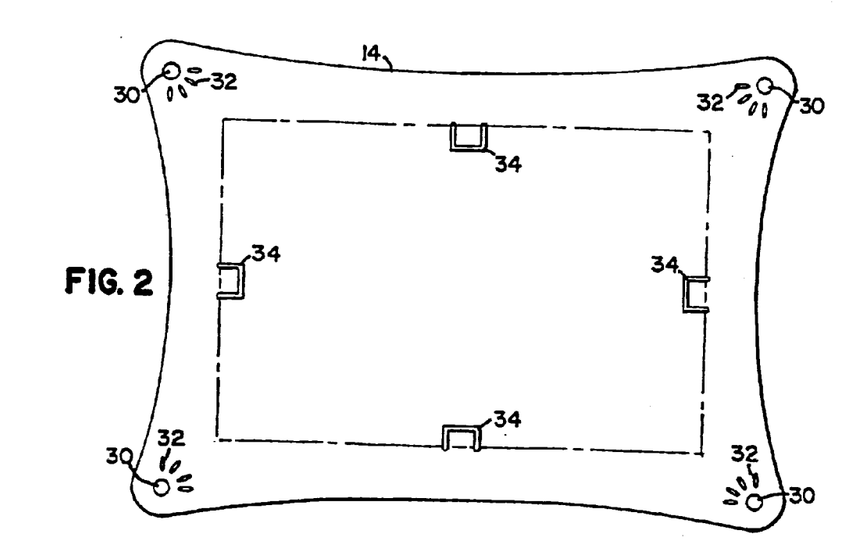
FIG. 2 is a plan view of a platform used in a preferred embodiment of the present invention.

In FIG. 2, lower platform 14 is shown in top planar view. Holes 30 are formed in lower platform 14 to allow pins 16 (FIG. 1) to be inserted. Detents 32 are formed in the proximity of holes 30 which allow elongates arms 20, when inserted through pins 16, to be positioned in a plurality of detent positions. One or more tabs 34 may be formed in lower platform 14 to allow for pest suppression device 18 to be affixed to lower platform 14. While particular dimensions of lower platform 14 are not important, other than being large enough to house or secure pest suppression device 18 and small enough to allow pest control device to be placed where it is to be used. In one preferred embodiment, lower platform 14 is sized to accommodate a pest suppression device of approximately 10.5 inches (26.6 centimeters) by 7 inches (17.8 centimeters).

While not explicitly shown in a separate view, upper platform 12 may be similar to lower platform 14. It should be recognized that detents 32 and tabs 34 need not necessarily be formed into both lower platform 14 and into upper platform 12. Rather, these features, if desired, may be formed into either of lower platform 14 or upper platform 12, or both. Also, detents 32 may be formed in one the elements and the tabs 34 formed in the other. Any combination is permissible, e.g., detents 32 for one elongate arm 20 may be formed in one element and detents 32 for another elongate arm 20 be formed in the other.

Figure 3:
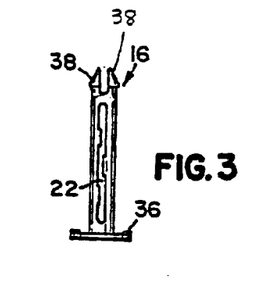
FIG. 3 is a plan view of a pin used in a preferred embodiment of the present invention.

Pin 16 is illustrated in FIG. 3. Pin 16 may be formed from a plastic material and could be sized to fit in holes 30 of upper platform 12 and/or lower platform 14. In a preferred embodiment, pin 16 has a head 36, a shank consisting of two prongs 38 forming slot 22. Two prongs 38 are tapered to allow pins 16 to be more easily inserted through holes 30.

Figure 4:
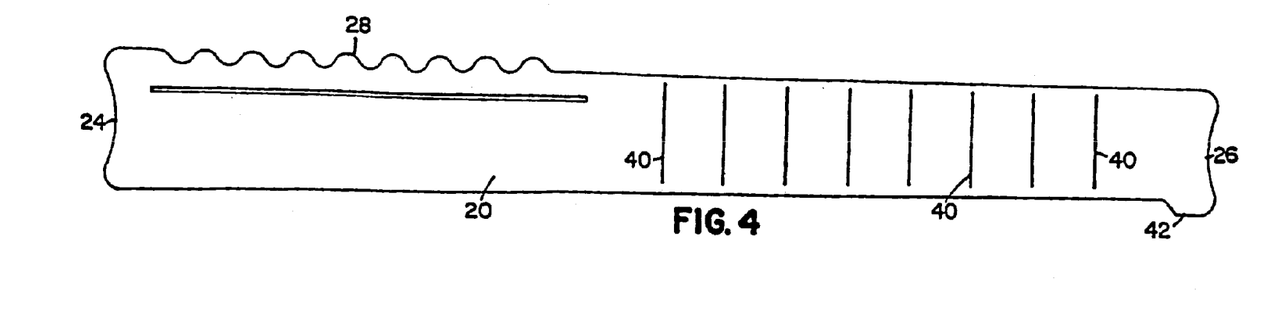
FIG. 4 is a plan view of an elongate arm used in a preferred embodiment of the present invention.

As mentioned above, the distal end 26 can be inserted through slot 22 in pin 16. Serrated edge 28 allows elongate arm to have a plurality of detent positions depending on the distance that proximate end 24 in inserted through slot 22. In a preferred embodiment, guide lines 40 are marked on the side of elongate arm 20 for use a guide in determining the distance which elongate arm 20 is inserted through slot 22. A slight lower tip 42 may be formed at the distal end 26 of elongate arm to allow distal end 26 of elongate arm to rest on the same horizontal surface on which lower platform 14 is placed.

While shown as a planar element in FIG. 4, elongate arm 20 could be formed from many other shapes including U-shapes and boxes, which still facilitate a pathway for the pest to be controlled from distal end 26 of elongate arm 20 to proximate end 24 of elongate and, ultimately, to pest suppression device 18.

The components of the pest control device 10 could be constructed from any of a variety of materials including, but not limited to plastic, cardboard and metal.

Figure 5:
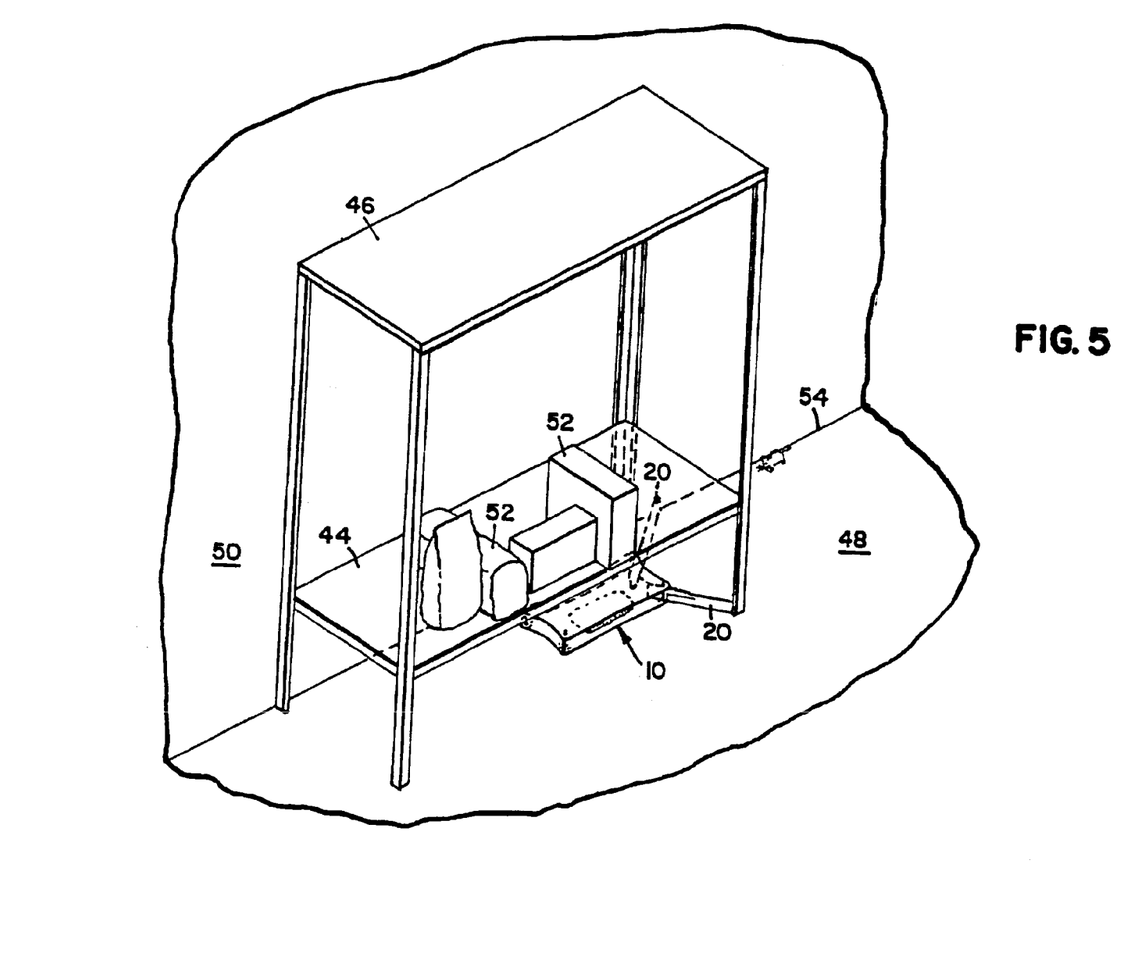
FIG. 5 is a perspective view of a preferred use of the pest control device of the present invention.

FIG. 5 illustrates one possible use of pest control device 10. Shelving (44 and 46) is shown positioned on a horizontal surface, such as floor 48, adjacent a vertical wall 50. Items 52 are normally stocked on shelving 44. In a typical environment, there is some space, but not a great deal of space, between shelving 44 and floor 48. Since pests, particularly rodents, are known to prefer to locate and travel in pest pathways or rodent runways in an out of the way space such as the juncture 54 between floor 48 and wall 50 and since shelving 44 and/or items 52 prevent easy access to juncture 54, it is difficult to set, place, service and retrieve a prior art pest control device from this location.

Shelving is sometimes located in middle of a room, i.e., away from a vertical surface, such as floor 48. For example, it is common in grocery stores to place shelving units back to back creating aisle ways in an otherwise open floor. Such shelving units commonly have lower shelves which are spaced from the floor. Sometimes, the front of the space below the lower shelf is covered. Whether covered or not, the relatively protected space under the shelving is a favored area for a pest pathway or rodent runway. Such spaces are also difficult to access.

However, pest control device 10 of the present invention may readily be placed, serviced and retrieved from these locations. One of elongate arms 20 of pest control device 10 may be adjusted (extended and/or pivoted) so that the distal end 26 of that elongate arm 20 is in the area of juncture 54 when pest control device 10 is place under shelving 44. Alternatively, elongate arm 20 may already be in an acceptable position. Once elongate arm 20 is positioned in an acceptable manner, pest control device 10 may easily be placed under shelving 44, if desired, and with distal end 26 of elongated arm 20 in the area of juncture 54.

Positioned in this manner, at least one of the elongate arms 20 facilitates a pathway from the area of juncture 54, where pests are commonly known to frequent, to the area of the pest suppression device 18 which doesn't have to be positioned proximate to juncture 54 but, rather, may be positioned nearer to the front of shelving 44 allowing for easier access.

Additional areas where pests, particularly rodents, are likely to be encountered are common pest pathways or rodent runways along ceiling or support beams, along suspended ceilings, or under shelving placed away from a wall or other vertical surface. In addition, the intersection of a horizontal surface, such as a floor, ceiling or shelf, and a vertical surface, such as a support member, utility pipe (e.g., plumbing, water, gas, air, waste) or shelf leg, are common pest pathways. Many of these pest pathways are relatively protected and difficult to access. Pest control device 10 of the present invention can readily be placed with pest suppression device positioned away from such pest pathways with the distal end 26 of an elongate arm 20 placed near the proximity of such pest pathways to both appropriately intercept pests and facilitate a pathway for the pest to pest suppression device 18 and also be able to be readily serviced.

As can be seen, pest control device 10 can be easily inserted into a difficult to access location, e.g., under shelving. The adjustability of elongate arms 20 allow elongate arms 20 to be extended or retracted and pivoted about the horizontal plane so that distal end 26 of at least one of the elongate arms may be positioned in the area most frequented, e.g., juncture 54, by the pests to be controlled.

While pest control device 10 is illustrated as having four elongate arms 20, it is to be recognized and understood that, in alternative embodiments, pest control device 10 may be constructed of only one elongate arm 20, or other numbers of elongate arms as may be desired. In a preferred embodiment, pest control device 10 has a plurality of elongate arms 20, which allows distal end 26 of at least one the elongate arms 20 to be placed in the area where the pests to be controlled are most likely to frequent or to travel through. At the same time, another of the plurality of elongate arms 20 may be used as a handle by the person installing pest control device 10 to place pest control device 10 and, as a consequence, the proper placement of distal end 26 another of the plurality of elongate arms 20. This allows a great deal of flexibility and ease of placing, servicing and removing pest control device 10.

While FIG. 5 has been described with use next to a wall 50, it is understood the present invention may be used when the shelving is on the floor, away from a wall 50. In such instances, the pest control device 10 creates a pathway under the shelving in the middle of a floor which discourages a pest from wandering out from under the shelving into public view, but rather directs a pest to suppression device 18. The pest control device is placed either under one shelf approximately in the middle of that shelf, or in the instances where two shelves are placed back-to-back, the pest control device 10 would be placed preferably in the middle of the two shelves. It is, of course, understood that the exact location as to where underneath the shelves the pest control device 10 is located is variable, but proximate the middle of the single shelf or the middle of the combined shelving shelves is preferred. The distal end 26 of at least one of the elongate arms 20 extends from the platform 14 and provides for a pathway into the pest control device 10. The other distal ends 26 of the other arms 20, if utilized, may also be used to create additional pathways into the pest control device 10. Alternately, as previously described, the elongate arms 20 may also be used as a handle to position the pest control device 10 under the shelving, preferably between the front edge and rear edge of the shelving.

It is anticipated that pest control device will most likely be placed on a horizontal surface. However, other placements are contemplated. As an example, pest control device may be placed on an inclined surface where desired, or may be placed on a vertical surface (with proper attachment) in appropriate circumstances.

Figure 6:
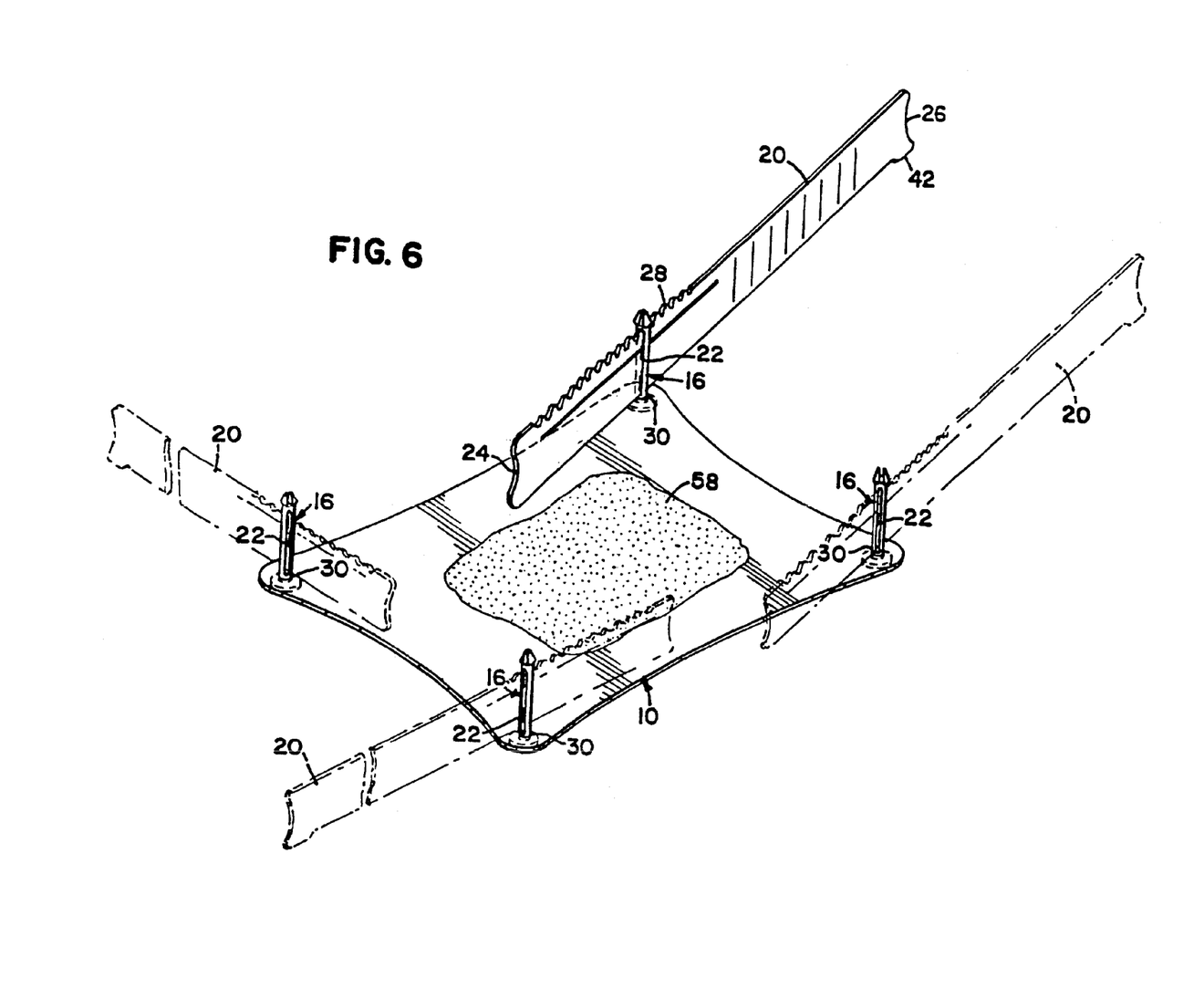
FIG. 6 is a perspective view of an alternative embodiment of the pest control device of the present invention.

FIG. 6 illustrates an alternative embodiment of pest control device 10. In this embodiment, elongate arms 20 are connected directly to pest suppression device 18. In an example, pest control device 18 is a glue pad having a support surface 56 and a pad of glue 58. In this embodiment, elongate arms are shown coupled to pest suppression device 18 in a manner similar to the coupling of elongate arms 20 to pest control device 10 using pins 16. It is recognized that alternative means of attachment are also contemplated. Also, it is to be recognized and understood that while the alternative embodiment illustrated in FIG. 6 shows a pest control device 10 with four elongate arms 20 that other embodiments in which only one or another number of elongate arms is envisioned.

In some cases, a pest encountering pest control device 10 as illustrated above with respect to FIGS. 1 through 6 will scale elongate arm 20 avoiding deflection to pest suppression device 18 and, instead, allowing the pest relatively unencumbered passage along the pest's intended track. For example, a pest traveling along the juncture 54 between floor 48 and vertical wall 50 may encounter distal and 26 of elongate arm 20. Instead of being diverted along the elongate arm 20 toward pest suppression device 18, the pest may instead jump or crawl over elongate arm 20 and continue the pest's original track along juncture 54 between floor 48 and vertical wall 50.

Figure 7:
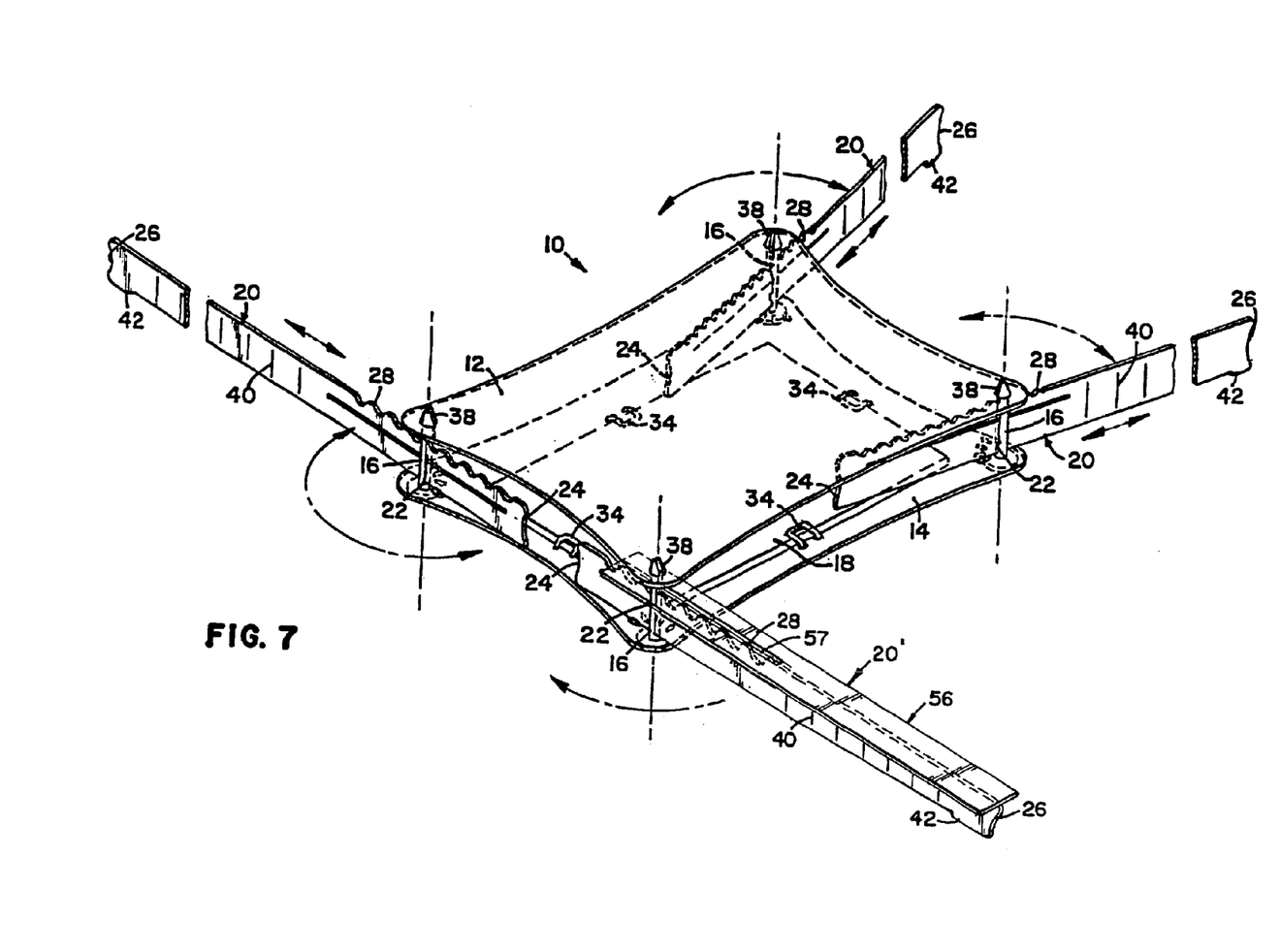
FIG. 7 is a preferred embodiment of a preferred embodiment of the present invention.

Pest control device 10 in FIG. 7 illustrates an embodiment of the present invention similar to pest control device 10 illustrated in FIGS. 1 through 6 with the exception of the structure of elongate arms 20. Elongate arms 20' illustrated in FIG. 7 have an overhanging structure consisting of a top surface 56 running along a portion of the top of the elongate arm 20'. Slot 57 in overhanging structure 56 and elongate arm 20' allows the proximate end of elongate arm 20' to be installed around pin 16. It would be difficult for a pest encountering elongate arm 20' with top surface 56 to jump or crawl over elongate arm 20' in order to prevent being diverted to pest suppression device 18. Top surface 56 preferably extends along either side of the otherwise planar elongate arm 20'. Thus, a pest approaching elongate arm 20' from either side would be similarly prevented from traversing elongate arm 20'.

Figure 8:
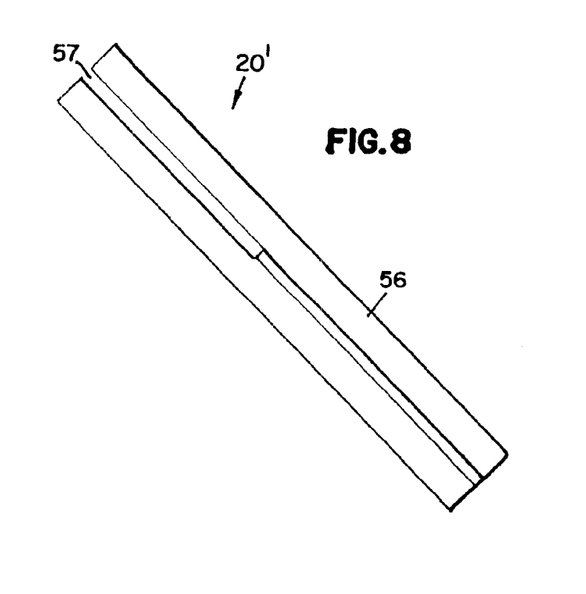
FIG. 8 is a plan view of a preferred embodiment of an elongate arm used in a preferred embodiment of the present invention.
Figure 9:
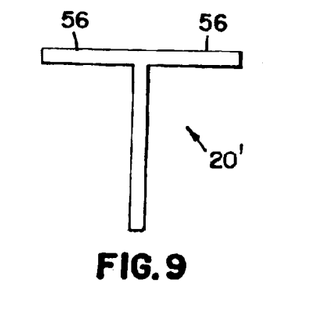
FIG. 9 is cross-sectional view of an embodiment of an elongate arm used in a preferred embodiment of the present invention.
Figure 10:
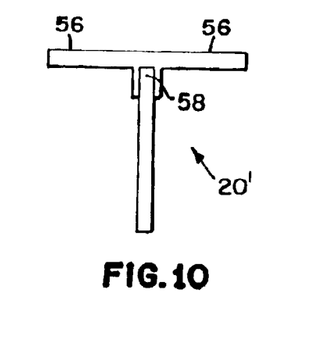
FIG. 10 is cross-sectional view of an embodiment of an elongate arm used in a preferred embodiment of the present invention.

Elongate arms 20' illustrated in FIGS. 7 and 8 have a planar vertical surface and a planar top surface 56 forming a "T" cross section. As shown in FIG. 9, elongate arm 20' having a "T" cross section may be formed, e.g., extruded, in a single piece. Alternatively, as shown in FIG. 10, elongate arm 20' having a "T" cross section may be formed from two separate pieces, for example, a planar vertical surface with a generally planar top surface 56 formed with a notch 58 which can be fit onto the top edge of a planar vertical surface of elongate arm 20'.

Figure 11:
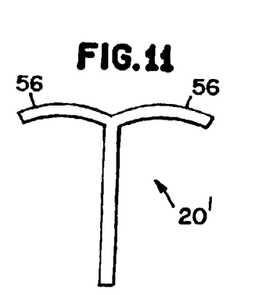
FIG. 11 is cross-sectional view of an alternative embodiment of an elongate arm used in a preferred embodiment of the present invention.
Figure 12:
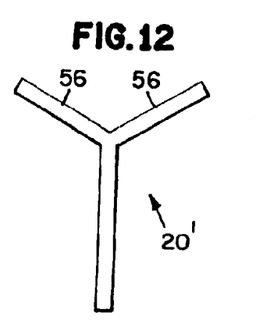
FIG. 12 is cross-sectional view of an alternative embodiment of an elongate arm used in a preferred embodiment of the present invention.
Figure 13:
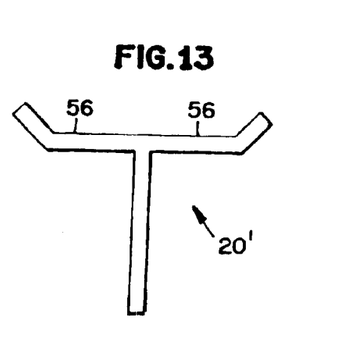
FIG. 13 is cross-sectional view of an alternative embodiment of an elongate arm used in a preferred embodiment of the present invention.
Figure 14:
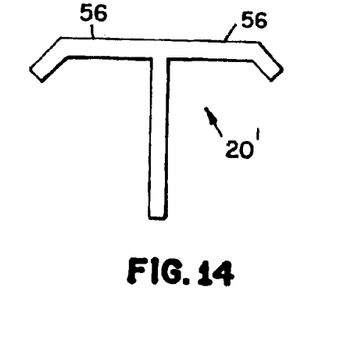
FIG. 14 is cross-sectional view of an alternative embodiment of an elongate arm used in a preferred embodiment of the present invention.

It is to be recognized and understood that top surface 56, performing and overhanging structure, may have many alternative cross-sectional shapes. As an example, top surface 56 illustrated in FIG. 11 has overhanging arcuate arches on either side of the planar vertical surface. FIG. 12 illustrates another alternative embodiment in which top surface 56, in conjunction with planar vertical surface, forms a cross-sectional "Y". FIG. 13 illustrates still another alternative embodiment in which top surface 56 is generally horizontally planar but has edges which are angled upward. Contrastingly, FIG. 14 has top surface 56 which, begin, is generally horizontally planar but, in this case, as edges which are angled downward. Of course, many other shapes are also possible.

Pest control device 10 may be used with distal end 26 of elongate arm 20' placed near juncture 54 of floor 48 and vertical wall 50 in order to intersect a common traveling path for the pest being controlled. In many cases, it may be desirable that pest control device 10 may be placed with elongate arm 20' very near to or contacting vertical wall 50 with elongate arm at an angle with vertical wall 50. If this is the case, an overhanging structure 56 having a square edge will result in distal end 26 being forced away from vertical wall 50 allowing the space for the pest being controlled to pass between elongate arm 20' and vertical wall 50, thus defeating the entire purpose of pest control device 10. Of course, if overhanging structure 56 does not have a square end, then the portion of overhanging structure 56 which is not placed on an acute angle with vertical wall 50 will leave the space in which it may be possible for the pest being controlled to scale the planar vertical surface over elongate arm 20', thus traversing elongate arm 20', and also frustrating the purpose of pest control device 10.

Figure 15:
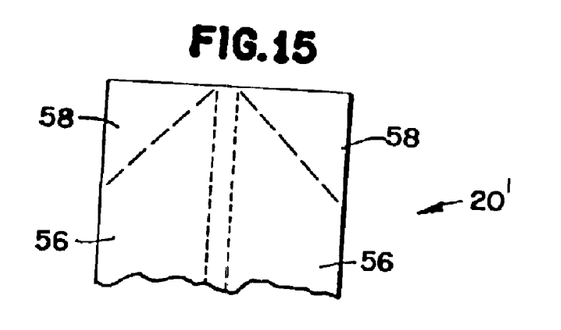
FIG. 15 is a plan view of a distal end portion of an alternative embodiment of an elongate arm used in an embodiment of the present invention.
Figure 16:
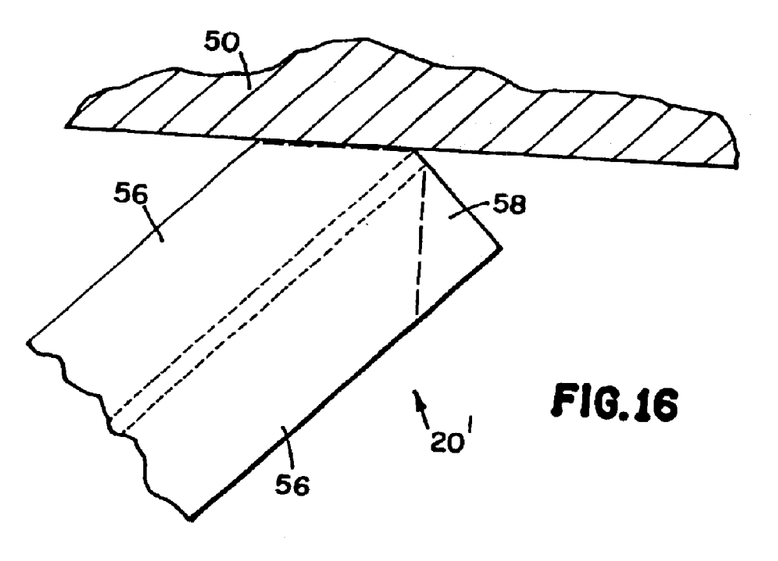
FIG. 16 is a plan view of the distal end portion of the alternative embodiment of the elongate arm of FIG. 15 shown placed in use against a vertical wall.

As seen in FIG. 15, distal end 26 of overhanging structure 56 may be formed with breakaway or tear away angled tabs 58. The user of pest control device 10 may then snap away or tear away tab 58 on the side of elongate arm 20' making an acute angle with vertical wall 50. FIG. 16 provides an illustration of the distal portion of elongate arm 20' having an overhanging structure 56 in which a tab 58 has been snap away or torn away from overhanging structure 56 allowing distal end 26 of elongate arm 20' to form a tight fit with vertical wall 50.

Figure 17:
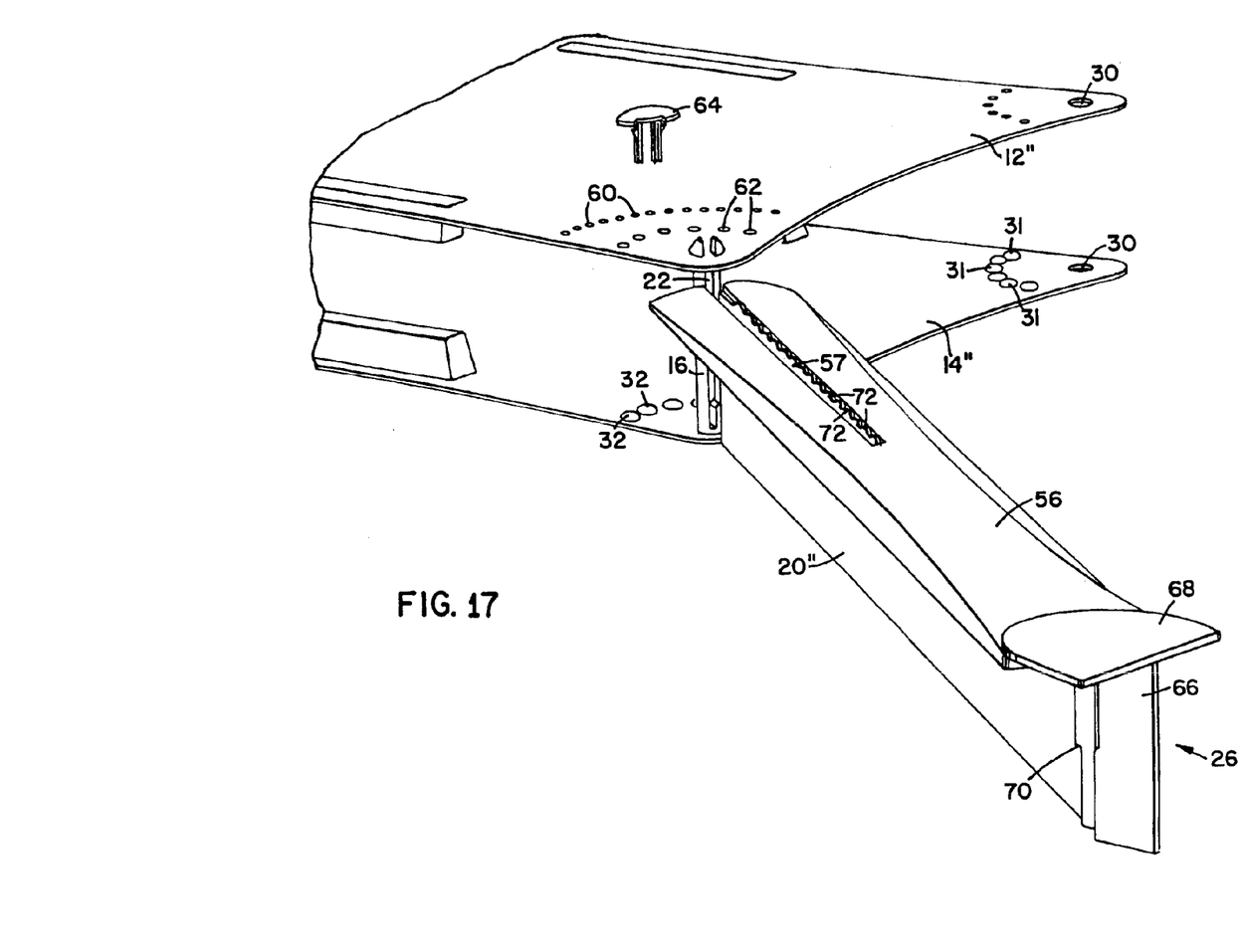
FIG. 17 is an exploded view of an alternative embodiment of an elongate arm used in an embodiment of the present invention.
Figure 18:
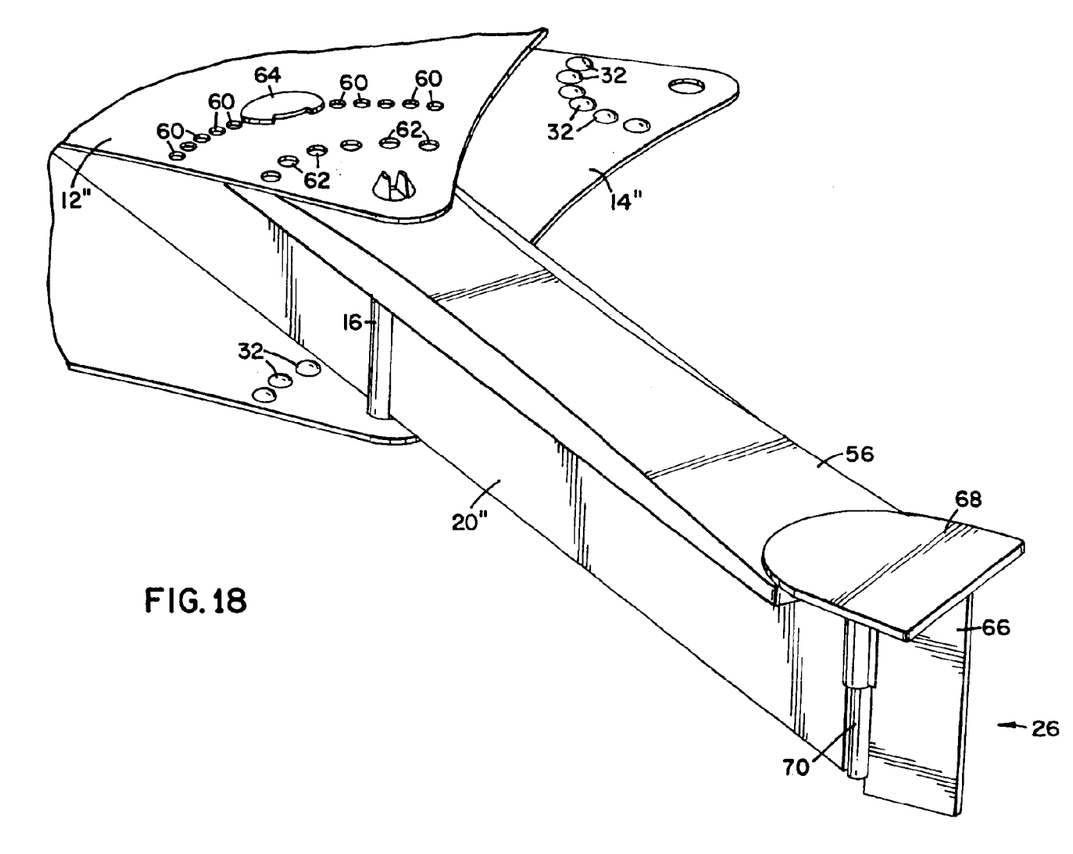
FIG. 18 is an assembled view of the alternative embodiment illustrated in FIG. 17.

FIG. 17 and FIG. 18 illustrate an alternative embodiment elongate arm 20". Distal end 26 of elongate arm 20" has end piece 66 having a top piece 68 that is coupled to a remaining portion of elongate arm 20" with hinge 70. Hinge 70 allows end piece 66 to be angled so that the vertical portion of end piece 66 and the square end of top piece 68 may be placed against a vertical surface even if a remaining portion of elongate arm 20" is placed at a non-right angle with the vertical surface.

Further, elongate arm 20" has slot 57 allowing overhanging structure 56 to pass around pin 16 while allowing the vertical portion of elongate arm 20" to pass through pin 16. Detents 32 in lower platform 14 allow elongate arm 20" to pivot with respect to lower platform 14 and be held in a desired angular position. Bumps 72 on the top of overhanging structure 56 interact with holes 62 for securing a desired amount of extension of elongate arm 20". Cap 64 may be placed in holes 60 and cooperates with the proximate end of elongate arm 20" to secure the proximate end of elongate arm 20" in a desired position.

Thus, there has been shown and described a novel pest control device and a novel method of suppressing a pest. It is to be recognized and understood that various changes, modifications and adjustments may be made to the above described invention without departing from the scope of the claims.

What is claimed is:

1. A pest control device for controlling a pest, comprising:
    a pest suppression device having an ingress for said pest; and
    an elongate arm having a proximate end and a distal end, said proximate end of said elongate arm connected to said pest suppression device communicating with said ingress and facilitating a pathway for said pest from said distal end of said elongate arm to said ingress, said elongate arm having an overhanging structure inhibiting said pest from transversing said elongate arm;
    wherein said pest control device has a generally planar surface, wherein said generally planar surface is horizontal when said pest control device is in use, wherein said elongate arm has a major axis, and wherein said major axis of said elongate arm is positioned horizontally when said pest control device is in use.

2. The pest control device as in claim 1 wherein said elongate arm comprises a generally planar sheet.

3. The pest control device as in claim 2 wherein said generally planar sheet is substantially vertical.

4. The pest control device as in claim 3 wherein said overhanging structure comprises a generally planar arid substantially horizontal top affixed to said generally planar sheet.

5. The pest control device as in claim 4 wherein said generally planar and substantially horizontal top of said overhanging structure at said distal end of said elongate aim has an angular portion which may be removed creating an end of said overhanging structure which has an acute angle with respect to said generally planar sheet allowing said distal end of said elongate arm to be placed in close proximity to an adjoining generally vertical structure when said elongate aim is placed at an acute angle to said adjoining generally vertical structure.

6. A pest control device for controlling a pest, comprising:
a pest suppression device having an ingress for said pest; and
an elongate arm having a proximate end and a distal end, said proximate end of said elongate arm connected to said peat suppression device communicating with said ingress and facilitating a pathway for said peat from said distal end of said elongate arm to said ingress, said elongate arm having an overhanging structure inhibiting said pest from transversing said elongate arm;
wherein said elongate inn articulates with respect to said pest suppression device.

7. A peat control device for controlling a pest, comprising:
a pest suppression device having en ingress for said pest; and
an elongate arm having a proximate end and a distal end, said proximate end of said elongate arm connected to said peat suppression device communicating with said ingress and facilitating a pathway for said peat from said distal end of said elongate arm to said ingress, said elongate arm having an overhanging structure inhibiting said pest from transversing said elongate arm;
wherein said pest control device has generally planar upper and lower surfaces, said generally planar upper and lower surfaces being horizontal when said pest control device is in use.

8. A pest control device for controlling a pest, comprising:
a pest suppression device having an ingress for said pest; and a plurality of elongate arms, each having a proximate end and a distal end, said proximate end of each of said plurality of elongate arms allowing communication with said ingress and facilitating a pathway for said pest from said distal end of each of said plurality of elongate arms to said ingress each of said plurality of elongate arms having an overhanging structure inhibiting said pest from transversing said elongate arms;
wherein said distal end of at least one of said plurality of elongate arms is extendible and retractable with respect to said pest suppression device.

9. The pest control device as in claim 8 wherein said at least one of said plurality of elongate arms comprises a planar sheet mounted vertically to said pest suppression device and has a top edge and wherein said top edge of said proximate end of said planar sheet has a plurality of serrations allowing said extendibility of said at least one of said of plurality of elongate arms to be extendible in a plurality of detent positions.

10. A pest control device for controlling a pest, comprising: a platform allowing for mounting of a pest suppression device having at least one ingress for said pest;
an elongate arm having a proximate end and a distal end, said proximate end of said elongate arm connected to said pest suppression device communicating with said ingress and facilitating a pathway for said pest from said distal end of said elongate arm to said ingress, each of said plurality of elongate arms having an overhanging structure inhibiting said pest from transversing said elongate arm.

11. The pest control device as in claim 10 wherein said pest control device has a generally planar surface, wherein said generally planar surface is horizontal when said pest control device is in use, wherein said elongate arm has a major axis, and wherein said major axis of said elongate aim is positioned horizontally when said pest control device is in use.

12. The pest control device as in claim 11 wherein said elongate arm comprises a generally planar sheet.

13. The pest control device as in claim 12 wherein said generally planar sheet is substantially vertical.

14. The pest control device as in claim 13 wherein said overhanging structure comprises a generally planar and substantially horizontal top affixed to said generally planar sheet.

15. The pest control device an in claim 10 wherein said elongate arm articulates with respect to said platform.

16. The pest control device as in claim 10 having a plurality of elongate arms, each having a proximate end and a distal end, said proximate end of each of said plurality of elongate arms being connected to said platform allowing communication with said ingress and facilitating a pathway for said pest from said distal end of each of said plurality of elongate arms to said platform.

17. The pest control device as in claim 16 wherein said distal end of at least one of said plurality of elongate arms is extendible and retractable with respect to said pest suppression device.

18. The pest control device as in claim 17 wherein said at least one of said plurality of elongate arms comprises a planar sheet mounted vertically to said pest suppression device and has a top edge and wherein said top edge of said proximate end of said planar sheet has a plurality of serrations allowing said extendibility of said at least one of said of plurality of elongate arms to be extendible in a plurality of detent positions.

19. The pest control device as in claim 18 in which said platform has a plurality of detents located near said proximate end of at least one of said plurality of elongate arms allowing said one of at least one of said plurality of elongate arms to be pivoted in a plurality of detent positions.

20. The pest control device as in claim 10 wherein said pest suppression device is to be placed away from a pest pathway and wherein said distal end of said elongate arm is to be placed in proximity of said pest pathway.

21. The pest control device as in claim 20 wherein said pest pathway is a juncture between a horizontal surface and a vertical surface.

22. The pest control device as in claim 21 wherein said vertical surface is a wall.

23. The pest control device as in claim 21 wherein said vertical surface is one of a group consisting of pipes, posts, legs and supports.

24. The pest control device as in claim 21 wherein said horizontal surface is a floor.

25. The pest control device as in claim 21 wherein said horizontal surface is one of a group consisting of suspended ceilings, shelves and beams.

26. The pest control device as in claim 10 wherein said distal end of said elongate arm has a hinged end piece allowing said end piece to be placed against a vertical surface when said elongate is not orthogonal to said vertical surface.

27. A method of suppressing a pest, where said pest is expected to be found near a juncture between a horizontal surface and a vertical surface and where access to said juncture between said horizontal surface and said vertical surface is difficult to access, comprising the steps of:
  placing a pest control device on said horizontal surface distant from said juncture of said horizontal surface and said vertical surface, said pest control device having:
    a platform allowing for mounting of a pest suppression device having at least one ingress for said pest; and
    an elongate arm having a proximate end and a distal end, said proximate end of said elongate arm connected to said pest suppression device communicating with said ingress and facilitating a pathway for said pest from said distal end of said elongate arm to said ingress, said elongate arm having an overhanging structure inhibiting said pest from transversing said elongate arm; and
  moving said distal end of said elongate arm in proximity of said juncture of said horizontal surface and said vertical surface when said pest control device is placed creating a pathway from said juncture of said horizontal surface and said vertical surface to said pest suppression device.

28. A method of suppressing a pest, where there is an opening between a horizontal surface and a bottom of a shelf, the shelf having a front edge and a rear edge, comprising the steps of:
  placing a pest control device on said horizontal surface at a position underneath the shelf and positioned between the front edge and the rear edge, said pest control device having:
    a platform allowing for mounting of a pest suppression device having at least one ingress for said pest; and
    an elongate arm having a proximate end and a distal end, said proximate end of said elongate arm connected to said pest suppression device communicating with said ingress and facilitating a pathway for said pest from said distal end of said elongate arm to said ingress, said elongate arm having an overhanging structure inhibiting said pest from transversing said elongate arm; and
    moving said distal end to a position between the front edge and the rear edge when said pest control device is placed creating a pathway from under the shelf to the pest control device.

29. The method of claim 28, further comprising the pest control device having a second elongate arm having a proximate end and a distal end, said proximate end of said second elongate arm connected to said platform, the method further comprising using the second elongate aim as a handle to position the pest control device.

30. The method as in claim 28 wherein said pest suppression device to be placed from a pest pathway and wherein said distal end of said elongate arm is to be placed in proximity of said pest pathway.

31. The method as in claim 30 wherein said pest pathway is a juncture between a horizontal surface and a vertical surface.

32. The method as in claim 31 wherein said vertical surface is a wall.

33. The method as in claim 31 wherein said vertical surface is one of a group consisting of pipes, posts, legs and supports.

34. The method as in claim 31 wherein said horizontal surface is a floor.

35. The method as in claim 31 wherein said horizontal surface is one of a group consisting of suspended ceilings, shelves and beams.

36. The method as in claim 28 wherein said distal end of said elongate arm has a hinged end piece and further comprising the step of pivoting said hinged end piece and placing said end piece against a vertical surface.

37. A pest control device for controlling a pest, comprising:
  a pest suppression device having an ingress for said pest; and
  an elongate arm having a proximate end and a distal end, said proximate end of said elongate arm connected to said pest suppression device communicating with said ingress and facilitating a pathway for said pest from said distal end of said elongate arm to said ingress, said elongate arm having overhanging structure inhibiting said pest from transversing said elongate arm;
  wherein said distal cad of said elongate arm has a hinged end piece allowing said end piece to be placed against a vertical surface when said elongate is not orthogonal to said vertical surface.

* * * * *